(12) United States Patent
Bowen

(10) Patent No.: US 8,818,145 B2
(45) Date of Patent: Aug. 26, 2014

(54) OPTICAL INTERPOSER WITH TRANSPARENT SUBSTRATE

(75) Inventor: Terry Patrick Bowen, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 232 days.

(21) Appl. No.: 13/197,004

(22) Filed: Aug. 3, 2011

(65) Prior Publication Data
US 2013/0034325 A1  Feb. 7, 2013

(51) Int. Cl.
*G02B 6/122* (2006.01)
*G02B 6/00* (2006.01)
*H01R 43/00* (2006.01)

(52) U.S. Cl.
USPC .............................................. 385/14; 29/825

(58) Field of Classification Search
USPC ...................... 385/14, 33, 37, 88–90, 147, 92
See application file for complete search history.

(56) References Cited

U.S. PATENT DOCUMENTS

| | | | |
|---|---|---|---|
| 5,018,164 A | 5/1991 | Brewer et al. | |
| 5,853,960 A | 12/1998 | Tran et al. | |
| 6,017,681 A * | 1/2000 | Tsukamoto et al. | 430/321 |
| 6,236,786 B1 * | 5/2001 | Aoki et al. | 385/50 |
| 6,810,160 B2 * | 10/2004 | Sugama et al. | 385/14 |
| 7,399,125 B1 * | 7/2008 | Whaley et al. | 385/92 |
| 7,466,880 B2 * | 12/2008 | Windover | 385/14 |
| 7,511,258 B2 | 3/2009 | Bowen et al. | |
| 7,995,881 B2 * | 8/2011 | Hodono | 385/18 |
| 2002/0131727 A1 | 9/2002 | Reedy et al. | |
| 2003/0156327 A1 | 8/2003 | Terakawa et al. | |
| 2004/0234210 A1 * | 11/2004 | Nagasaka et al. | 385/88 |
| 2011/0075965 A1 | 3/2011 | DeMeritt et al. | |

FOREIGN PATENT DOCUMENTS

EP  1321790 A2  6/2003

OTHER PUBLICATIONS

International Search Report, International Application No. PCT/US2012/049418, International Filing Date Aug. 3, 2012.
M. Heckele et al, "Hot embossing—The molding technique for plastic microstructures", Microsystem Technologies, vol. 4, No. 3, May 27, 1998, pp. 122-124.

* cited by examiner

*Primary Examiner* — Akm Enayet Ullah

(57) ABSTRACT

An optical interposer comprising a transparent substrate having first and second sides, at least one OED mounted to the first side, at least one reflective surface and at least one groove defined on the second side, and an optical conduit disposed in the groove optically coupled to the OED by the reflective surface.

11 Claims, 4 Drawing Sheets

OPTICAL INTERPOSER WITH TRANSPARENT SUBSTRATE

FIELD OF INVENTION

The subject matter herein relates generally to fiber optic substrates, and more particularly, to a planar interposer with electrical components mounted on one side and optical components mounted on the opposite side.

BACKGROUND OF INVENTION

Fiber optic components are used in a wide variety of applications. The use of optical fibers as a medium for transmission of digital data (including voice, internet and IP video data) is becoming increasingly more common due to the high reliability and large bandwidth available with optical transmission systems. Fundamental to these systems are optical subassemblies for transmitting and/or receiving optical signals.

Optical subassemblies typically comprise an interposer. As used herein, an interposer functions as a substrate for optical, opto-electrical, and electrical components and provides interconnections to optically and/or electrically interconnect the optical/opto-electrical/electrical components. Generally, although not necessarily, the axis of the opto-electric devices (OEDs) and that of the fiber tend to be perpendicular when mounted in the interposer. Accordingly, the interposer serves not only to optically couple the OED and the fiber, but also to bend the light to effect the coupling.

There is a general need to simplify both the design and manufacture of interposers. To this end, a new type of interposer has been introduced in which the electrical components, including the OED, are on one side of the interposer, while the optical conduit is mounted on the other side. This configuration avoids the need for vias to provide an electrical path from one side of the interposer to the other because all the OEDs, associated circuitry and electrical interconnects are located on the same side of the interposer.

Although an interposer configured with the optical conduit on one side and electronics on the other simplifies manufacturing, it does pose its own challenges. For example, as mentioned above, an interposer generally needs to bend/turn the light perpendicularly between the OEDs and the fibers. To this end, separate molded light turning elements are typically used to bend the light between the OED and the fibers. Unfortunately, these light turning elements tend to be expensive to manufacture, and are relatively time consuming to incorporate onto the interposer as they must be both aligned and bonded to the substrate. Additionally, because these light turning elements are separate/discrete components which are independently molded and handled, they require a certain mass to provide the necessary strength and size to facilitate molding and handling. Consequently, these elements tend to be relatively bulky and add considerable height to the interposer. This is particularly problematic because interposers are often used in space-restricted situations in which height must be minimized. Thus, not only are the light turning elements expensive to prepare and complicated to install, but they also add undesirable height to the interposer.

Therefore, there is a need for an interposer configuration that avoids the need for discrete light turning elements that must be aligned and bonded to the substrate. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

DETAILED DESCRIPTION

Figure 1:
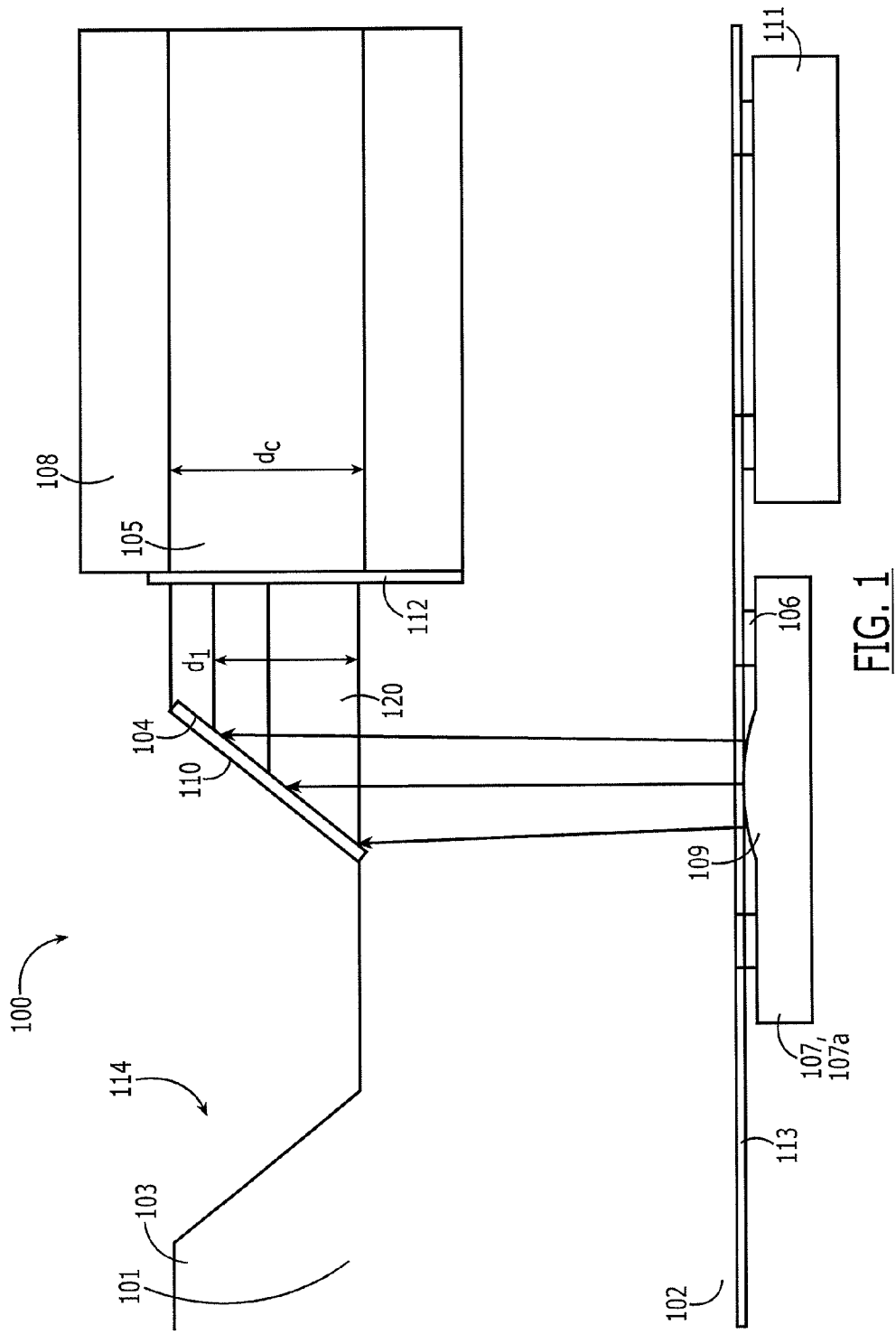
FIG. 1 shows one embodiment of the transparent interposer of the present invention having optical features defined integral to the substrate of the interposer.

Referring to FIG. 1, one embodiment of the interposer 100 of the present invention is shown. The interposer 100 comprises a transparent substrate 101 having first and second sides 102, 103, respectively. The first side comprises electrical contact pads 106 and the second side defines at least one reflective surface 104 and at least one groove 105. At least one OED 107 is mounted to the electrical contact pads 106 on the first side. The groove 105 holds an optical conduit 108, which is optically coupled to said OED 107 by said reflective surface 104. Each of these elements is described in greater detail below.

The substrate 101 serves a number of purposes. Its primary purpose is to function as the backbone of the interposer to support and secure an optical conduit, OED(s) and supporting electrical circuitry. Accordingly, it should be a relatively rigid material that is thermally stable, suitable for being heated to temperatures typical in solder reflow applications. The substrate in this embodiment also functions as a conduit for light, allowing light to pass through it between the OED 107 and the optical conduit 108. Accordingly, the substrate 101 must be transparent at the wavelength of light being transmitted between the OED and optical conduit. In this respect, it should be appreciated that transparency may be a function of wavelength. In other words, a material may not be transparent for light at one wavelength, but may be transparent for light at a different wavelength. Therefore, the transparency of the substrate needs to be determined based on the expected wavelength of the light being transmitted. For example, in one embodiment, the substrate is optically transparent for wavelengths of 850, 980, 1060, 1310, and 1550 nm. Suitable materials that are both rigid and transparent at one or more of the desired wavelengths include, for example, various types of glass, quartz, polysilicon, amorphous silicon, and silicon. In one particular embodiment, the substrate 101 is glass, which has the benefit of being particularly rigid, transparent at essentially all currently used wavelengths, and inexpensive.

The substrate 101 defines the optical and electrical features and provides the alignment between the OED and the optical conduit. The optical features include the reflective surface 104 and one or more grooves 105 for receiving and holding the optical conduit 108. The process and techniques that are used to define these optical features are discussed below. The groove 105 may be a traditional V-groove, or its sides may be perpendicular to the top planar side such that it resembles more of a U-groove or similar trench configured to precisely hold and position an optical conduit relative to the reflective surface 104. Although single fiber applications are shown and described herein, it should be appreciated that the invention is not limited to single fiber applications and is also applicable to arrays of fibers and ribbon fiber and to planar waveguide arrays and waveguide ribbons as well. The reflective surface 104 can be defined by a continuous groove 114, which runs essentially perpendicular to groove 105, or there can be a separate reflective surface 104 for each groove 105. Techniques and approaches for preparing these optical features are discussed below.

The reflective surface 104 may rely on differences in the refractive index of the substrate material and air to turn the light. Thus, although the term "reflective surface" is used, it should be appreciated that in this context, the term "reflective" also contemplates total internal reflection. In one embodiment, a reflective coating 110 is applied to the surface 104 to insure the reflectivity of the surface, and to protect the reflective surface from dirt or moisture from condensation. Suitable reflective materials include, for example, gold, silver, aluminum and various dielectrics. The materials may be deposited on the reflective surface 104 using known techniques, including, evaporation, sputtering and vapor deposition.

Figure 2:
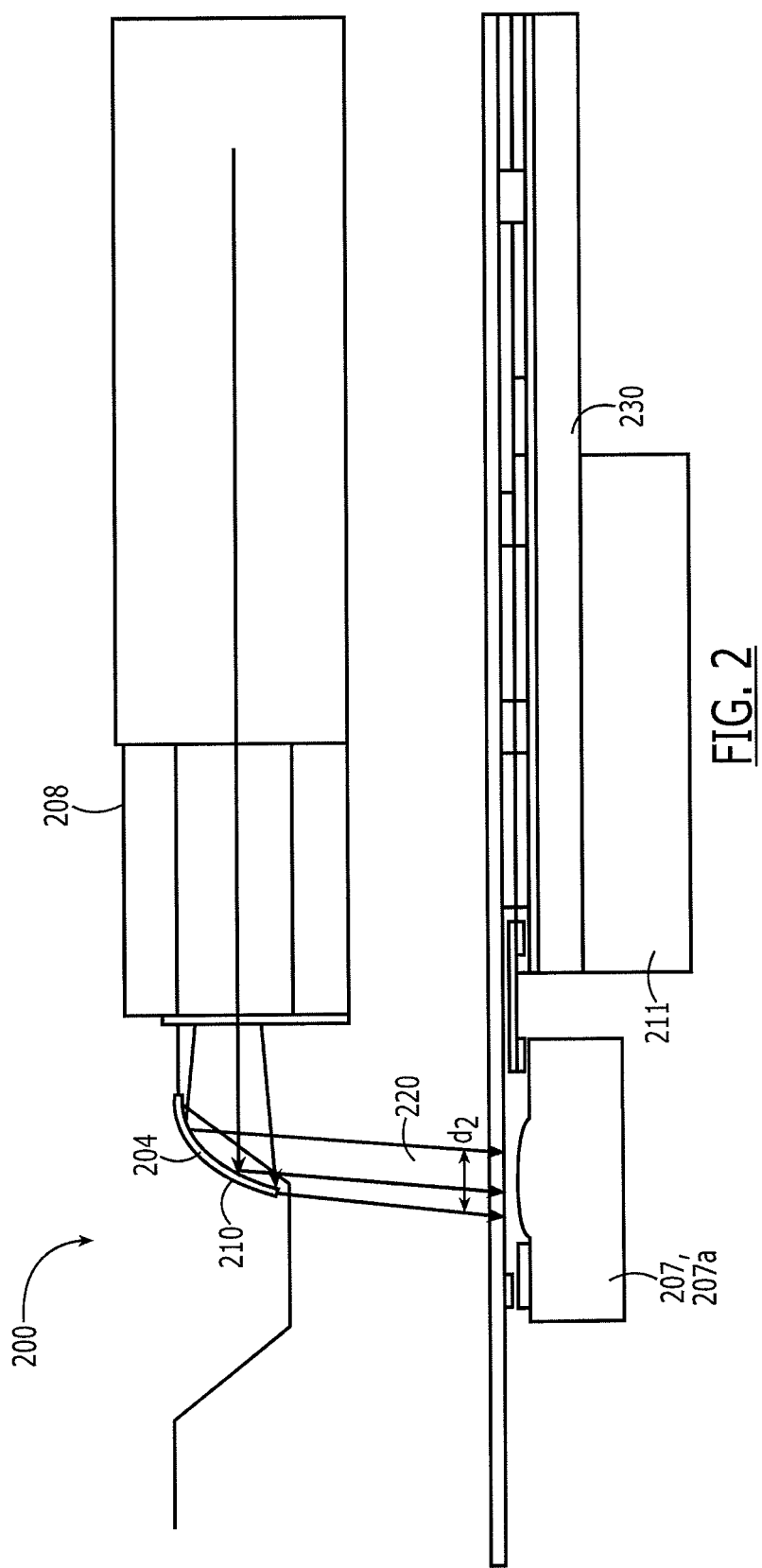
FIG. 2 shows another embodiment of the transparent interposer of the present invention in which a curved reflective surface is used.

The reflective surface 104 may be configured to optimize the optical coupling between the OED 107 and optical conduit 108. For example, it may be a straight reflective surface 104 as shown in FIG. 1, or it may be a curved reflective surface 204 as shown in FIG. 2. The curvature of reflective surface 204 can be on more than 1 axis to form an imaging mirror for reflective lensing. The configuration of the reflective surface will depend to a significant degree on the diameter of the beam being received by either the OED or optical conduit. Specifically, some degree of lensing on the reflective surface 104 will typically be required if the diameter $d_1$ of beam 120 is larger than the core size $d_c$ of the optical conduit shown in FIG. 1, or if the diameter $d_2$ of beam 220 is larger than the acceptance aperture of the OED 207 as shown in FIG. 2. (Note: in the embodiment of FIG. 1, the OED 107 is a transmitter, while the OED 207 in the embodiment of FIG. 2 is a receiver.) Diameters $d_1$ and $d_2$ are a function of the thickness of the substrate and the angle of divergence of the beam 120, 220. A divergent beam will diverge more in a thicker substrate because the beam has more opportunity to expand. In the case of an interposer having a front/back configuration, the substrate is typically relatively thick to provide adequate rigidity. Therefore, to maintain a relatively narrow diameter beam suitable for coupling with the core of optical conduit or the aperture of the OED, the beam must have a low divergence or the reflective surface must have some degree of lensing.

For example, referring to FIG. 1, the OED 107 in this embodiment is a transmitter, and in particular, a VCSEL 107A. The beam 120 transmitted from the VCSEL 107A propagates through the substrate 101, is turned about ninety degrees by the reflective surface 104, and then is launched into the core of the optical conduit 108 as shown. In this embodiment, the diameter of the beam 120 at the input of the optical conduit 108 is diameter of $d_1$, which is depicted as being narrower than the core size $d_c$. Therefore, no lensing of the reflective surface 104 is necessary. It should be pointed out, however, that in this embodiment, the low divergent beam 120 is a result of an integral substrate lens 109 on the OED 107.

Referring to FIG. 2, an embodiment is shown in which the OED 207 is a receiver, which, in this particular embodiment, is a photo detector 207A. In this embodiment, light emitted from the optical conduit 208 is reflected by the reflective surface 204 into the photo detector 207A. The diameter $d_2$ of the beam 220 should be less than the acceptance aperture of the photo detector. Generally speaking, given the wide angle of divergence of the light beam 220 leaving the optical conduit 208 and the relatively small acceptance aperture typical of the photo detectors, some kind of lensing on the reflective surface 204 is typically required. Likewise, if the OED 107 shown on FIG. 1 did not have an integral substrate lens 109, the beam 120 would have a larger divergent angle, which would necessitate lensing the reflective surface 104 similar to lens 204.

The curved or lens surface of the reflective surface 204 can be imparted to the interposer 200 in a variety of different ways. For example, it may be added as a liquid and then solidified by UV embossing or it may be a separate discrete molded part that is bonded to the reflective surface. Alternatively, it may be etched or hot embossed onto the substrate as discussed below.

Regardless of the formation technique used, in one embodiment, the groove 114, which defines the reflective surface 104, is made particularly wide to provide access to the reflective surface 104 as shown in FIG. 1. As mentioned above, to insure the reflectivity, it may be preferable to apply a reflective material 110, 210 to the reflective surface.

In one embodiment, to accommodate the optical features, including the reflective surface and the groove, a two layer substrate is used. Specifically, referring to FIG. 3, an interposer is shown in which the substrate 301 comprises a first layer 330 and an emboss material layer 331, which is accurately embossed to define the shape and position of the reflective surface 304 and the groove 308. The embossed layer 331 is discussed in greater detail below with respect to a method of preparing the interposer.

The groove 105 is adapted to receive an optical conduit 108. As used herein, the term "optical conduit" refers to any know medium for facilitating the propagation of optical signal in a certain direction. Common optical conduits include, for example, optical fibers and planar optical waveguides. Such optical conduits typically, although not necessarily, comprise a core and a cladding around the core to facilitate the light propagation down the optical conduit.

The electrical contact pads 106 on the first side of the substrate 101 are configured to receive the OED 107 as shown in FIG. 1. In this context, an OED may be any device which converts between optical energy and electrical energy, such as, lasers (e.g., vertical cavity surface emitting laser (VC-SEL), double channel, planar buried heterostructure (DC-PBH), buried crescent (BC), distributed feedback (DFB), distributed bragg reflector (DBR)), light-emitting diodes (LEDs) (e.g., surface emitting LED (SLED), edge emitting LED (ELED), super luminescent diode (SLD)), and photo-diodes (e.g., P Intrinsic N (PIN) and avalanche photodiode (APD)), or hybrid device which does not convert optical energy to another form but which changes state in response to a control signal such as switches, modulators, attenuators, and tunable filters. It should also be understood that the OED may be a single discrete device or it may be assembled or integrated as an array of devices. If the OED is an edge emitting device, an additional right angle turning mirror will be needed.

The OED has at least one optical axis along which the light propagates to/from the OED. Because the OED is disposed over the optical conduit and optically coupled thereto by virtue of a reflective surface defined in the interposer, generally, although not necessarily, the optical axis is essentially perpendicular to the planar surface. It should be understood that the OED is not limited to a single optical axis.

As mentioned above, in one embodiment, the OED comprises a lens 109 to shape the beam 120 and minimize divergence. The preparation of lenses on such OEDS is known and described in U.S. Pat. No. 5,853,960 and 5,018,164.

Also mounted on the first side 101 is the associated circuitry and drivers 111 to operate the OED 107. The associated circuitry 111 is connected to traces (not shown) for interfacing the interposer with a higher level flex circuit or printed circuit board 230. This is a known technique. Alternatively, as shown in FIG. 2, a flex circuit may be configured to fit around the associated circuitry 211 to provide the necessary interface with the associated circuitry and avoid the need for additional traces and interconnections therewith.

Another aspect of the invention is a method of making the interposer. In one embodiment, the method comprises: (a) viewing through a transparent substrate to align electrical contacts on a first side of the transparent substrate with optical features on a second side of the transparent substrate; (b) defining the electrical contacts on the first side; (c) defining the optical features on the second side, the optical features including at least one reflective surface and at least one groove (and optionally treating the reflective surface to ensure reflectivity); (d) disposing the OED on the electrical contacts; and (e) disposing an optical conduit in the groove, the optical conduit and the OED being optically coupled through the reflective surface. These steps are considered in greater detail below with respect to FIGS. 1-4. It should be understood that the sequence of these steps may be varied in different embodiments. For example, in one embodiment, step (b) is performed before steps (a) and (c). This way, the electrical contacts or their position may be viewed through the transparent substrate to determine the proper location of the optical features. Alternatively, step (b) may be performed and then step (d) before step (c). This way, the OEDs may be viewed through the transparent substrate to determine the proper location of the optical features. In yet another embodiment, step (a) involves first establishing fiducials which can be viewed from either side through the transparent substrate to define both the electrical contacts and the optical features. Still other embodiments and sequences will be obvious to one skilled in the art in light of this disclosure.

Alignment between the optical and electrical components on either side of the substrate 101 is critical to ensure that the OED 107 and optical conduit 108 are optically coupled by the reflective surface 104. The transparency of the substrate 101 facilitates this alignment by allowing features on one side to be viewed from the other side. Such front-side-of-wafer to back-side-of-wafer alignment techniques are known and can be practiced on a commercial scale using commercially available devices.

The techniques for aligning and electrically interconnecting the electrical components with the OEDs on the substrate can vary. For example, in one embodiment, fiducials are marked just on one side of the substrate and both the electronics and OEDs on the first side and the optical features on the second side are registered based on the common fiducials. Fiducials may be any structure or marking which provides for the passive alignment of the OED. A variety of fiducials may be used. Still other approaches for aligning the optical and electronic components by viewing through the substrate will be obvious to one of skill in the art in light of this disclosure.

The reflective surface 104 and groove 105 can be prepared in a variety of different ways. For example, wet etching techniques can be used to form V-grooves to receive the fibers. Such V-grooves are known to position precisely cylindrical objects, such as fibers. Although wet etching also can be used to etch a groove 114 into the second side of the substrate 101 to define the reflective surface 104, additional steps may be required to optimize the reflective surface 104. Specifically, the pitch of the walls of the V-groove formed by wet etching depends upon the crystal structure of the substrate. Few materials have a crystalline structure that will result in a 45 degree pitch as is needed for the reflector surface. Accordingly, an additional step of adding a reflective element or otherwise modifying the surface 104 may be required.

Alternatively, rather than wet etching, dry etching can be used. Dry etching refers to the removal of material typically using a masked pattern by exposing the material to a bombardment of ions (usually a plasma of reactive gases such as fluorocarbons, oxygen, chlorine, boron trichloride; sometimes with addition of nitrogen, argon, helium and other gases) that dislodge portions of the material from the exposed surface. Unlike typical wet etching, dry etching typically etches directionally or anisotropically, and thus is not dependent on the crystalline structure of the substrate.

Because dry etching is not limited or controlled by the crystalline structure of the underlying substrate, dry etching can be used to produce wall slopes of any desired angle in a wide variety of substrate materials. Accordingly, in one embodiment, the reflective surface 104 is configured with an optimum angle/shape to result in efficient optical coupling between the OED and the core of the optical conduit. Generally, although not necessarily, this angle will be about a 45 degree angle if the optical axis of the optical conduit is at a right angle to optical axis of the OED.

In yet another embodiment, machining techniques may be used to create the grooves at the reflective surface. In particular, it may be beneficial to have one continuous reflective surface across a number of different interposers on a common wafer. In this embodiment, it may be advantageous to machine the reflective surface 104 as described, for example, in U.S. application Ser. No. 13/172,568, incorporated herein by reference.

In yet another embodiment, the optical features of the reflective surface and groove are created by embossing. Specifically, referring to FIG. 3, in one embodiment, the interposer 300 comprises a substrate 301 comprises a first layer 330 and an embossed layer 331. The embossed layer 331 defines the reflector surface 304 and groove 305 as described above. In one embodiment, a groove 314 having a unique curve surface shape may be embossed into the embossed layer 331 to provide a curved reflective surface 304 as shown. Additionally, a U-groove or similar receiving cavity for the optical conduit 308 can be embossed in the same step.

Embossing is a known technique and can be performed with commercially available equipment including, for example, EV Group's UV and hot embossing nanoimprint lithography equipment. There are various embossing techniques available. For example, UV embossing involves embossing a fluid layer with a mold stamp and then exposing that fluid layer to UV to solidify it. Alternatively, thermal embossing involves embossing a solidified layer with a heated mold that shapes the layer as it softens it.

Embossing has a number of benefits. First, it allows the grooves and the reflective surface to be defined in a single step. Additionally, embossing has the advantage of providing unique shapes to the reflective surface allowing its curvature to be optimized for a particular application. Conversely, wet etching and even dry etching can be limited in the surface shapes that can be prepared.

Figure 3:
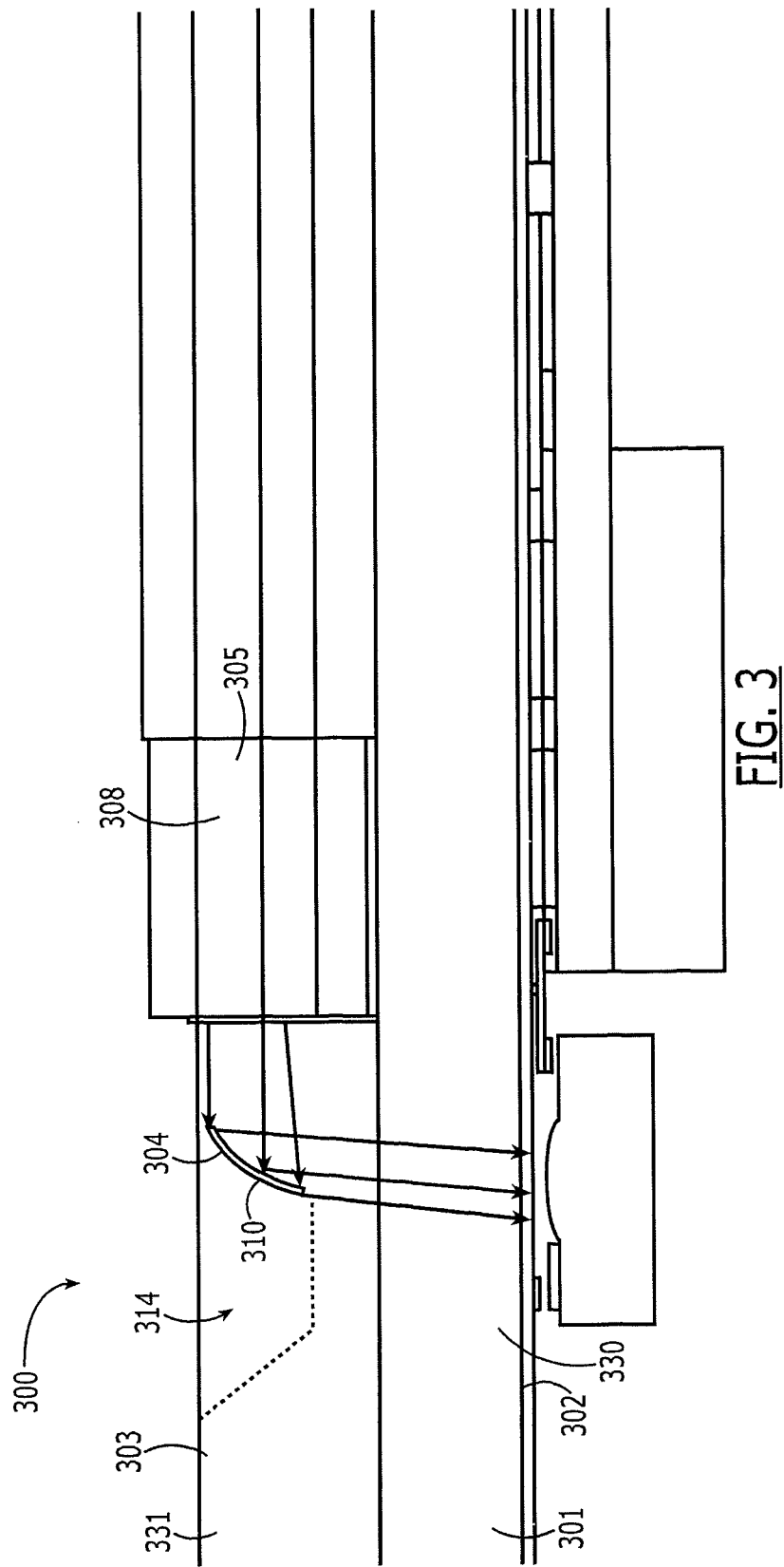
FIG. 3 shows another transparent interposer embodiment of the present invention in which the optical features are embossed.

As mentioned above, to insure the reflectivity of the reflecting surface 104 it may be preferable to apply a metallized surface 110, 210 and 310 as shown in FIGS. 1, 2 and 3 respectively.

Once the substrate is configured, it is populated with the optical conduit and the OED and associated electronics. The optical conduit may be secured to the groove in a variety of known ways. For example, a fiber may be metallized and soldered in place or it may be glued in place. In one embodiment, a UV-cured, optically transparent adhesive is used to secure the optical conduit in the groove. Such an approach may be preferable to reduce Fresnel losses, as any gaps between the OED, the terminal end of the groove and the end face of the optical conduit would be filled with the optically transparent adhesive. It is generally preferred although not necessary that a reflective gel or other index matching component is used between the optical conduit 108 and the substrate 101.

Incorporating the OED and circuitry into the interposer involves first defining and depositing the solder pads. Applying the solder pads is a known technique for facilitating the alignment of the OED. The interposer of the present invention also comprises features for passively aligning the fiber/planar waveguide and the OED. One of the primary technical challenges associated with the manufacture of optical assemblies, especially systems offering higher levels of integration, is component optical alignment. This is especially applicable in free-space, interconnect optical systems where discrete OEDs are integrated on a common mounting system to exacting tolerances, typically in the sub-ten micrometer down to sub-micrometer range.

There are generally two alignment approaches for aligning OEDs—active and passive. In passive alignment, registration or alignment features are typically fabricated directly on the components as well as on the platform to which the components are to be mounted. The components are then positioned on the platform using the alignment features and affixed in place. In active alignment, the OEDs are placed on the platform, but before being affixed thereto, an optical signal is transmitted through the components while they are manipulated to provide optimum optical performance. Once optimum performance is achieved, the components are affixed to the platform. Although active alignment tends to be more precise than passive alignment, passive alignment facilitates high-speed, high-volume automated manufacturing and, thus, is preferred. It tends to be exceedingly difficult, however, to optically align in all three axes using passive alignment, especially if exceptionally good alignment is required. Nevertheless, a significant reduction in manufacturing time and costs can be realized if passive alignment can be used to achieve acceptable alignment along two axes or even one so that active alignment is only necessary for the remaining axes or for fine tuning.

The interposer of the present invention may have a number of features to facilitate passive alignment of the OED. In one embodiment, the interposer has fiducials as mentioned above to facilitate passive alignment of the OED such that each of its optical axes is aligned with its respective reflective surface and groove.

In one embodiment, a pattern of contact pads is used that passively align the OED during a reflow operation. Specifically, the OED is provided with a certain pattern of contact pads on its mounting side, the interposer has the same pattern of pads on its first planar surface. The OED is then placed on the interposer pads in rough alignment using known pick and place technology. Alignment between the interposer pads and OED pads is then achieved when the assembly is reflowed such that the surface tension of the contact pads causes the patterns of the OED to align over the pattern on the interposer, thereby precisely positioning the OED relative to the reflective surfaces and grooves of the interposer. Such a mechanism is well known and disclosed, for example, in U.S. Pat. No. 7,511,258, incorporated herein by reference.

In another embodiment, rather than or in addition to contact pads, other fiducials on the interposer are used to facilitate passive alignment. For example, the fiducials may be physical structures protruding from the planar surface that provide a register surface against which the edge of the OED may contact to be positioned correctly on the interposer. Alternatively, the fiducials may be markings to enable visual alignment of the OED on the interposer using a commercially-available, ultra-high precision die bonding machine, such as, for example, a Suss MicroTec machine (See, e.g., U.S. Pat. No. 7,511,258).

Additionally, a combination of fiducials and contact pads may be used. For example, the pads may be used to pull the OED into contact with the raised fiducials of the interposer. Still other alignment techniques will be apparent to one of skill in the art in light of this disclosure.

Therefore, the interposer of the present invention may have one or more features for optically coupling an OED to an optical conduit, features for providing passive alignment of the optical conduit and/or OED, and electrical/optical interconnections for interconnecting the OED with required circuitry and for interfacing the interposer with the higher level flex circuit or printed circuit board.

In one embodiment, it is preferable to coat the first side 102 with an anti-reflective coating 113 as shown in FIG. 1.

Figure 4:
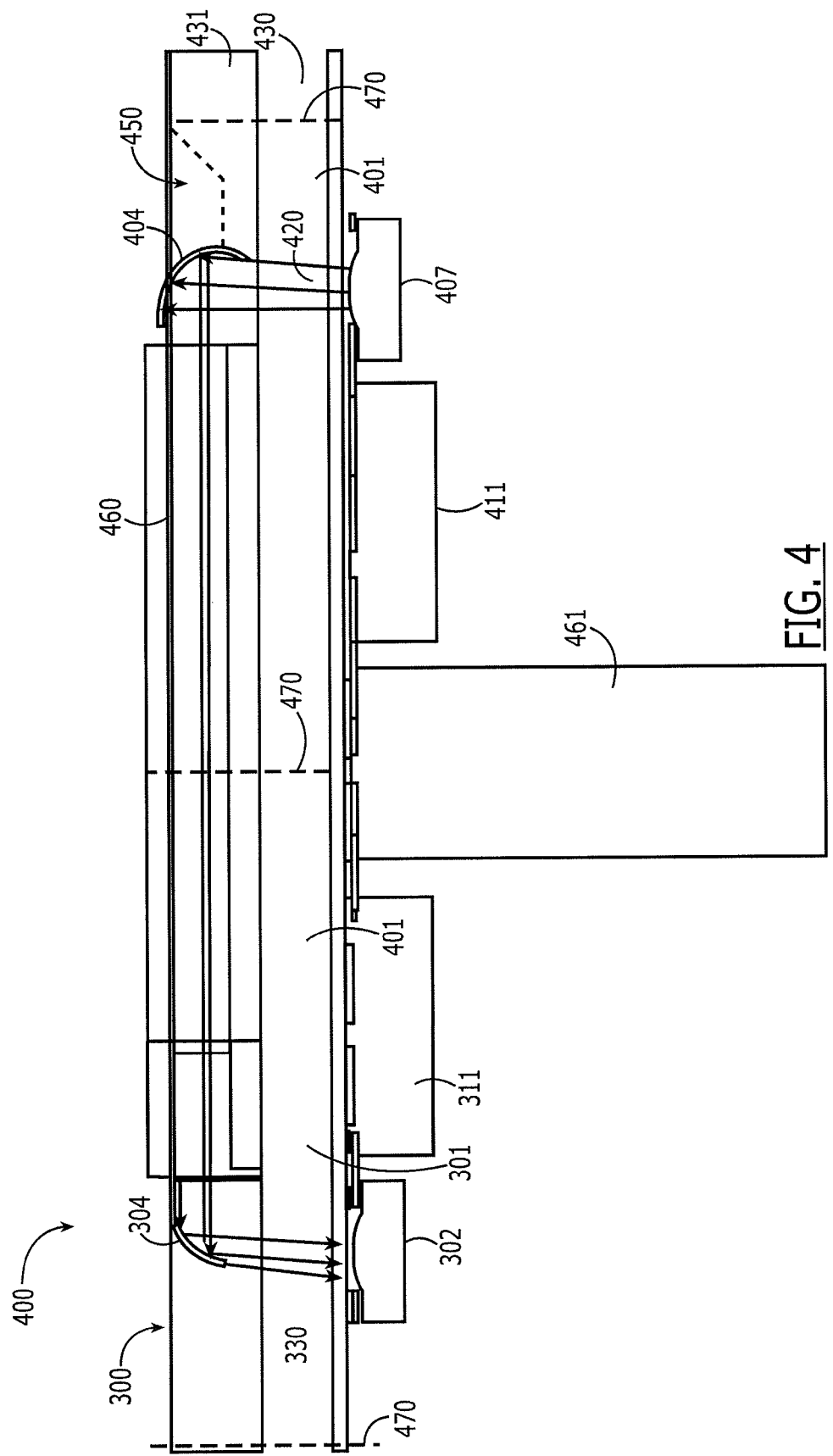
FIG. 4 shows an embodiment of preparing the transparent interposer of the present invention in which pairs of interposers on a wafer are optically coupled and tested together.

The interposer of the present invention also lends itself to economical and highly repeatable manufacturing. In one embodiment, a significant portion of the preparation of the interposer is performed at the wafer/panel stage. That is, rather than preparing each interposer as a discrete component, multiple interposers can be prepared simultaneously on a wafer/panel. This is a known technique to facilitate large-scale manufacturability. Benefits of wafer/panel fabrication include the ability to define multiple features and components on multiple interposers in one step. For example, most if not all of the critical alignment relationships may be defined on the wafer/panel scale, often in just a few, or even a single, photolithography step. Specifically, the location of the grooves for holding the optical conduit and the reflecting surfaces for providing passive alignment of the OEDs may be defined in a single masking/embossing step. Additionally, in one embodiment, the optical/electrical interconnections among the various OED and electrical components may be defined in a single masking step. For example, the various traces interconnecting the pads for the OED and the pads for the electrical driver circuitry, and the traces between the OED and driver circuitry may be defined in a single masking step. In one embodiment, even the edges of the interposers are defined in the same masking step. In other words, each edge 470 of the interposer as shown in FIG. 4 is one half of a groove etched in the wafer/panel. The wafer/panel is simply parted at the bottom of each groove to form interposers with precisely controlled edges. This way, the distance from the edge 470 of the interposer to critical features such as the grooves 408 may be precisely controlled, often in a single step, thereby eliminating tolerance build up and simplifying assembly manufacturing with the interposer by use of these precisely controlled edges. These advantages are expected to increase as the size of wafers/panels and their handling capabilities increase as well.

The etching may also be performed on wafer/panel-scale. In one embodiment, the grooves, terminal end facets, and the edges of the interposer are all defined and etched at the wafer/panel-scale. Further economies may be realized by etching these features in the same photolithographic procedure. Although a single etching procedure may be used, in certain circumstances, two or more etching procedures may be beneficial. That is, the facets of the interposer require dry etching to achieve the desired slope, however, the sidewalls of the interposer and the edges of the grooves may be etched using either wet or dry etching techniques. Therefore, if the dry etching is not as economical as wet etching (e.g., it takes longer and/or is more expensive), then it may be preferable to etch the terminal end facets using dry etching and the interposer and groove sidewalls/edges using wet etching.

Referring to FIG. 4, a wafer assembly 400 is shown in which a pair of interposers 300, 450 are prepared simultaneously. Interposer 300, as described in FIG. 3, has a receiving OED 302, while interposer 450 comprises a transmitting OED 407. By preparing these interposers as a pair on a wafer/panel 401, they can be optically coupled and thereby tested together. For example, in this particular embodiment, the optical features of interposers 300 and 450 are defined in the embossed layer. In this particular case, a curved reflective surface 304 is used to optically couple the optical conduit 460 with the detector OED 302 in interposer 300. Likewise, interposer 450 has a similar, but different, reflective surface 404, which is used to optically couple the transmitting OED 407 with the optical conduit 460.

While still in wafer/panel form, the OEDs, associated circuitry and driver circuitry 311, 411, and a test probe 461 are electrically connected to the pads on the first side of the substrates. In one embodiment, a temporary wave guide is incorporated into the wafer/panel as optical conduit 460 to optically couple the OED 407 and the OED 302 as shown. The test probe 461 then energizes the drive circuitry 411 to power OED 407 to emit a beam 420 into the substrate, through the first layer 430 and into the embossed layer 431. The beam 420 then encounters the reflective surface 404, is turned about 90 degrees such that it is launched into the optical conduit 408. At this point, the light travels through the temporary wave guide and into interposer 300. This light then exits the optical conduit 308, and the beam 220 is turned by the reflective surface 304 in the embossing layer 331 through the first layer 330 and into the detector 307a. Next, the photo detector 307a converts the optical signal into an electrical signal, which is transmitted to the associated circuitry 311. The associated circuitry 311 manipulates the signal in a known way, and transmits it back to the test probe 461. Thus, a loop from the test probe 461, to interposer 450, through interposer 300 and back to the test probe is completed. Depending upon the quality of signal received back at the test probe, the integrity of the interposers 300, 450 can be assessed.

Once the test is completed, the temporary wave guide may be removed by dissolving it using known techniques, and the individual interposers 300 and 450 are separated along dicing lines 470.

It should be apparent from the above description that the interposer assembly of the present invention provides for significant advantages over conventional electro-optic module configurations such as lower cost and simplicity in manufacturing and enhanced versatility with respect to the type of mating components with which it can effect optically coupling. Still other advantages of the interposer assembly are anticipated.

What is claimed is:

1. An optical interposer comprising:
   a transparent substrate having first and second sides, said second side defining a first groove and having at least one reflective surface aligned with said first groove;
   at least one electrical contact defined on said first side;
   at least one OED mounted to said electrical contact on said first side;
   an optical conduit disposed in said first groove and optically coupled to said OED by said at least one reflective surface.

2. The optical interposer of claim 1, wherein said transparent substrate comprises a first layer having said first side and an embossed layer having said second side.

3. The optical interposer of claim 2, wherein said reflective surface is curved.

4. The optical interposer of claim 1, wherein said OED comprises a lens, and said reflective surface is flat.

5. The optical interposer of claim 4, wherein sad OED is a transmitter.

6. The optical interposer of claim 1, wherein said OED comprises a lens and said reflective surface is curved.

7. The optical interposer of claim 6, wherein said OED is a receiver.

8. The optical interposer of claim 1, wherein said optical conduit is a fiber.

9. The optical interposer of claim 1, wherein said optical conduit is a waveguide.

10. The optical interposer of claim 1, wherein said substrate is homogeneous.

11. The optical interposer of claim 10, wherein said substrate comprises glass.

* * * * *